(12) United States Patent
Dattathreya

(10) Patent No.: US 8,490,054 B2
(45) Date of Patent: Jul. 16, 2013

(54) SOFTWARE AND RELATED SOFTWARE TRACKING DURING SOFTWARE MODIFICATION

(75) Inventor: Macam S. Dattathreya, Sterling Heights, MI (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 139 days.

(21) Appl. No.: 13/243,514

(22) Filed: Sep. 23, 2011

(65) Prior Publication Data

US 2013/0080997 A1    Mar. 28, 2013

(51) Int. Cl.
*G06F 9/44* (2006.01)

(52) U.S. Cl.
USPC ........... 717/121; 717/120; 717/101; 717/104; 717/122; 717/168

(58) Field of Classification Search
USPC ................. 717/100, 101, 104, 120, 121, 122, 717/168
See application file for complete search history.

(56) References Cited

U.S. PATENT DOCUMENTS

| | | | |
|---|---|---|---|
| 5,040,142 A | 8/1991 | Mori et al. | |
| 5,293,629 A | 3/1994 | Conley et al. | |
| 5,493,682 A | 2/1996 | Tyra et al. | |
| 5,706,452 A | 1/1998 | Ivanov | |
| 5,805,891 A | 9/1998 | Bizuneh et al. | |
| 6,274,145 B1 | 8/2001 | Chen et al. | |
| 7,069,592 B2 | 6/2006 | Porcari | |
| 7,127,702 B2 | 10/2006 | Seki | |
| 7,234,131 B1 | 6/2007 | Speyrer et al. | |
| 7,890,872 B2 | 2/2011 | Champlain et al. | |
| 2002/0049571 A1 | 4/2002 | Verma et al. | |
| 2002/0133395 A1 | 9/2002 | Hughes et al. | |
| 2004/0003266 A1 | 1/2004 | Moshir et al. | |
| 2007/0050678 A1 | 3/2007 | Estes et al. | |
| 2007/0157192 A1 | 7/2007 | Hoefler et al. | |

OTHER PUBLICATIONS

Atlassian IDE Connectors, Atlassian Tools + IDE, Internet—www.atlassian.com, Jul. 11, 2011, 2 Pages.
Atlassian, JIRA Issues and Bamboo builds, Internet—www.atlassian.com, Jul. 11, 2011, 2 Pages.
The Seapine View, Differences Between Builds/Releases, Internet—http://blogs.seapine.com, Jul. 11, 2011, 6 Pages.
OpenLogic, OpenLogic Exchange (OLEX) Features, Internet—www.openlogic.com, Jul. 11, 2011, 6 Pages.

*Primary Examiner* — Robert Fennema
*Assistant Examiner* — Lee Ebreo
(74) *Attorney, Agent, or Firm* — David L. Kuhn; Thomas W. Saur; Luis Miguel Acosta

(57) ABSTRACT

A system and method for tracking and notifying related software, modules, and configuration files during software development and maintenance. A database, software build programming, a software module tracker, requirements management tools, and software source code that includes a comments area are implemented in connection with user interfacing to provide the method.

20 Claims, 5 Drawing Sheets

| Table name → / Column names ↓ | Requirements Details (RD) | Software Details (SD) | Module Details (MD) | Configuration Details (CD) | Relationship Traceability (RT) |
|---|---|---|---|---|---|
| ReqId | X | | | | X |
| SoftId | | X | | | |
| ModId | | | X | | X |
| ConfigId | | | | X | X |
| TraceId | | | | | X |
| ReqName | X | | | | |
| SoftName | | X | | | |
| ModName | | | X | | |
| ConfigName | | | | X | |
| Author | | X | X | X | |
| vendorName | | X | | | |
| POC | | X | | | |
| Status | | X | X | X | X |
| Timestamp | X | X | X | X | X |
| ConfigType | | | | X | |
| Comments | | | | X | X |

FIG. 2

SOFTWARE AND RELATED SOFTWARE TRACKING DURING SOFTWARE MODIFICATION

GOVERNMENT INTEREST

The invention described here may be made, used and licensed by and for the U.S. Government for governmental purposes without paying royalty to me.

BACKGROUND OF THE INVENTION

1. Field of the Invention

The present invention generally relates to a system and method for tracking and notifying related software, modules, and configuration files during software development and maintenance.

2. Background Art

Conventional systems and methods for tracking and notifying related software, modules, and configuration files during software development and maintenance (e.g., integrated development environments, source control or version management, requirements management tools, and the like) may be ineffective at identifying and resolving issues that are generated when software modifications are made. For example, an undocumented change to one module may cause the same or a different module that had performed correctly to malfunction.

Thus, there exists a need and an opportunity for an improved system and method for tracking and notifying related software, modules, and configuration files during software development and maintenance. Such an improved system and method may overcome one or more of the deficiencies of the conventional approaches.

SUMMARY OF THE INVENTION

Accordingly, the present invention may provide an improved system and method for tracking and notifying related software, modules, and configuration files during software development and maintenance.

According to the present invention, a computer implemented system of tracking and notifying a user with regard to associated software, associated modules, and associated configuration files during development and maintenance of a given software, the system comprising:
an interface including display and input/output capability for the user; and
a development system having a processor and memory, wherein the development system is coupled to the user interface, the development system comprises:
a database, build programming for the given software, a software module tracker, requirements management tools, and the given software and the associated software include a comments area that includes an @author tag and an @modified tag, wherein the database, the build programming, the requirements management tools, and the given software are coupled to the software module tracker, and the build programming is coupled to the given software and the associated software, wherein the memory includes programming to control the processor to perform a method comprising the steps of:
 (A) initiating a build of the given software, wherein the given software includes details of requirements, and the associated software includes an associated software name, and the associated module includes an associated module name;
 (B) determining whether the build is a first build;
 (C) when the build is a first build, determining whether the requirements are managed in the tool;
 (D) when the requirements are managed in the tool, importing details of the requirements from the tool;
 (E) storing the details of the requirements in a database and proceeding to step (G), and when the requirements are not managed in the tool;
 (F) displaying a screen to allow the user to enter the details of the requirements, and proceeding to the step (E);
 (G) invoking a software module tracker;
 (H) parsing the given software for the associated modules;
 (I) for each of associated modules found, parsing to retrieve the associated configuration files used for the associated module;
 (J) storing the associated configuration file for the associated module in the database;
 (K) finalizing data collection;
 (L) displaying to the user a screen of a list of all of the requirements that are in the database for the given software;
 (M) displaying in a dropdown to the user for each requirement all of the associated modules, the associated software, and the associated configuration files;
 (N) allowing the users to associate the requirements with all of the associated modules, the associated software, and the associated configuration files to establish an associated relationship;
 (O) storing the associated relationship in the database;
 (P) for each of the associated modules found, parsing the associated module;
 (Q) determining whether an @author tag is present, and when the @author tag is present;
 (R) parsing author tag data, and also when the @author tag is not present;
 (S) determining whether an @modified tag is present, and when the @modified tag is present;
 (T) parsing the modified tag data, and also when the @modified tag is not present;
 (U) retrieving the associated module name and the associated software name;
 (V) displaying a screen for the user to enter a vendor name or a point of contact (POC) for the associated software along with the associated software name;
 (W) storing the details of the associated module along with the associated software name, the vendor name or the POC to a table in the database, and proceeding again to the step (K);
 (X) when the given software build is not the first build, building the given software a second or subsequent time after the given software was updated or modified;
 (Y) invoking the software module tracker;
 (Z) parsing the given software to determine the associated modules;
 (AA) determining whether one or more of the associated modules or the associated configuration files have been deleted;
 (AB) when one or more of the associated modules or the associated configuration files have been deleted, marking as "deleted" all references to the deleted associated modules in the database, and also when one or more of the associated modules or the associated configuration files are not deleted;
 (AC) determining whether new modules or new configuration files added; (AD) when the new modules or the new configuration files added, performing the steps (H) through (O);

(AE) when the new modules or the new configuration files not added, determine whether one or more of the associated modules or the associated configuration files are updated;
(AF) when one or more of the associated modules or the associated configuration files are updated, retrieving the associated modules and the associated configuration files from the database;
(AG) displaying to the user on a screen on an interface, a list of the associated modules, the associated software, and the associated configuration files for the updated associated module;
(AH) the user looking at the list that is displayed at the step (AG), and deciding whether to modify the given software, and when the user decides to modify the given software, returning to the step (X); and
(AI) when the user decides to not modify the given software, and also when one or more of the associated modules or the associated configuration files are not updated, ending the method.

The system wherein, the software module tracker is operated as a documentation to identify relationships among the associated software and the requirements satisfied by the associated software.

The system wherein, the software module tracker is operated by the user at any time to view the relationships among the associated software and the requirements satisfied by the associated software.

The system wherein, the software module tracker is operated in a batch mode.

The system wherein, the software module tracker further queries the database and sends alert emails to the POC to indicate possible changes needed for the associated module.

The system wherein, the software module tracker provides the user capability to develop the given software, and maintain the given software without involvement of an original developer.

The system wherein, the software module tracker informs the user which of the associated modules was modified.

The system wherein, the database is a relational database.

The system wherein, the software module tracker is programmed in C++.

The system wherein, the software module tracker is programmed in JAVA programming language.

Also according to the present invention, a computer system implemented method of tracking and notifying a user with regard to associated software, associated modules, and associated configuration files during development and maintenance of a given software may be provided. The method including the steps of
(A) initiating a build of the given software, wherein the given software includes details of requirements, and the associated software includes an associated software name, and the associated module includes an associated module name;
(B) determining whether the build is a first build;
(C) when the build is a first build, determining whether the requirements are managed in a tool;
(D) when the requirements are managed in the tool, importing details of the requirements from the tool;
(E) storing the details of the requirements in a database and proceeding to step (G), and when the requirements are not managed in the tool;
(F) displaying a screen to allow the user to enter the details of the requirements, and proceeding to the step (E);
(G) invoking a software module tracker;
(H) parsing the given software for the associated modules;
(I) for each of associated modules found, parsing to retrieve the associated configuration files used for the associated module;
(J) storing the associated configuration file for the associated module in the database;
(K) finalizing data collection;
(L) displaying to the user a screen of a list of all of the requirements that are in the database for the given software;
(M) displaying in a dropdown to the user for each requirement all of the associated modules, the associated software, and the associated configuration files;
(N) allowing the users to associate the requirements with all of the associated modules, the associated software, and the associated configuration files to establish an associated relationship;
(O) storing the associated relationship in the database;
(P) for each of the associated modules found, parsing the associated module;
(Q) determining whether an @author tag is present, and when the @author tag is present;
(R) parsing author tag data, and also when the @author tag is not present;
(S) determining whether an @modified tag is present, and when the @modified tag is present;
(T) parsing the modified tag data, and also when the @modified tag is not present;
(U) retrieving the associated module name and the associated software name;
(V) displaying a screen for the user to enter a vendor name or a point of contact (POC) for the associated software along with the associated software name;
(W) storing the details of the associated module along with the associated software name, the vendor name or the POC to a table in the database, and proceeding again to the step (K);
(X) when the given software build is not the first build, building the given software a second or subsequent time after the given software was updated or modified;
(Y) invoking the software module tracker;
(Z) parsing the given software to determine the associated modules;
(AA) determining whether one or more of the associated modules or the associated configuration files have been deleted;
(AB) when one or more of the associated modules or the associated configuration files have been deleted, marking as "deleted" all references to the deleted associated modules in the database, and also when one or more of the associated modules or the associated configuration files are not deleted;
(AC) determining whether new modules or new configuration files added;
(AD) when the new modules or the new configuration files added, performing the steps (H) through (O);
(AE) when the new modules or the new configuration files not added, determine whether one or more of the associated modules or the associated configuration files are updated;
(AF) when one or more of the associated modules or the associated configuration files are updated, retrieving the associated modules and the associated configuration files from the database;
(AG) displaying to the user on a screen on an interface, a list of the associated modules, the associated software, and the associated configuration files for the updated associated module;

(AH) the user looking at the list that is displayed at the step (AG), and deciding whether to modify the given software, and when the user decides to modify the given software, returning to the step (X); and (AT) when the user decides to not modify the given software, and also when one or more of the associated modules or the associated configuration files are not updated, ending the method.

The method wherein, the software module tracker is operated as a documentation to identify relationships among the associated software and the requirements satisfied by the associated software.

The method wherein, the software module tracker is operated by the user at any time to view the relationships among the associated software and the requirements satisfied by the associated software.

The method wherein, the software module tracker is operated in a batch mode.

The method wherein, the software module tracker further queries the database and sends alert emails to the POC to indicate possible changes needed for the associated module.

The method wherein, the software module tracker provides the user capability to develop the given software, and maintain the given software without involvement of an original developer.

The method wherein, the software module tracker informs the user which of the associated modules was modified.

The method wherein, the database is a relational database.

The method wherein, the software module tracker is programmed in C++.

The method wherein, the software module tracker is programmed in JAVA programming language.

The above features, and other features and advantages of the present invention are readily apparent from the following detailed descriptions thereof when taken in connection with the accompanying drawings.

BRIEF DESCRIPTION OF THE DRAWINGS

FIG. 2 is a diagram of a database that may be implemented in the system of FIG. 1.

DETAILED DESCRIPTION OF THE PREFERRED EMBODIMENT(S)

Figure 1:
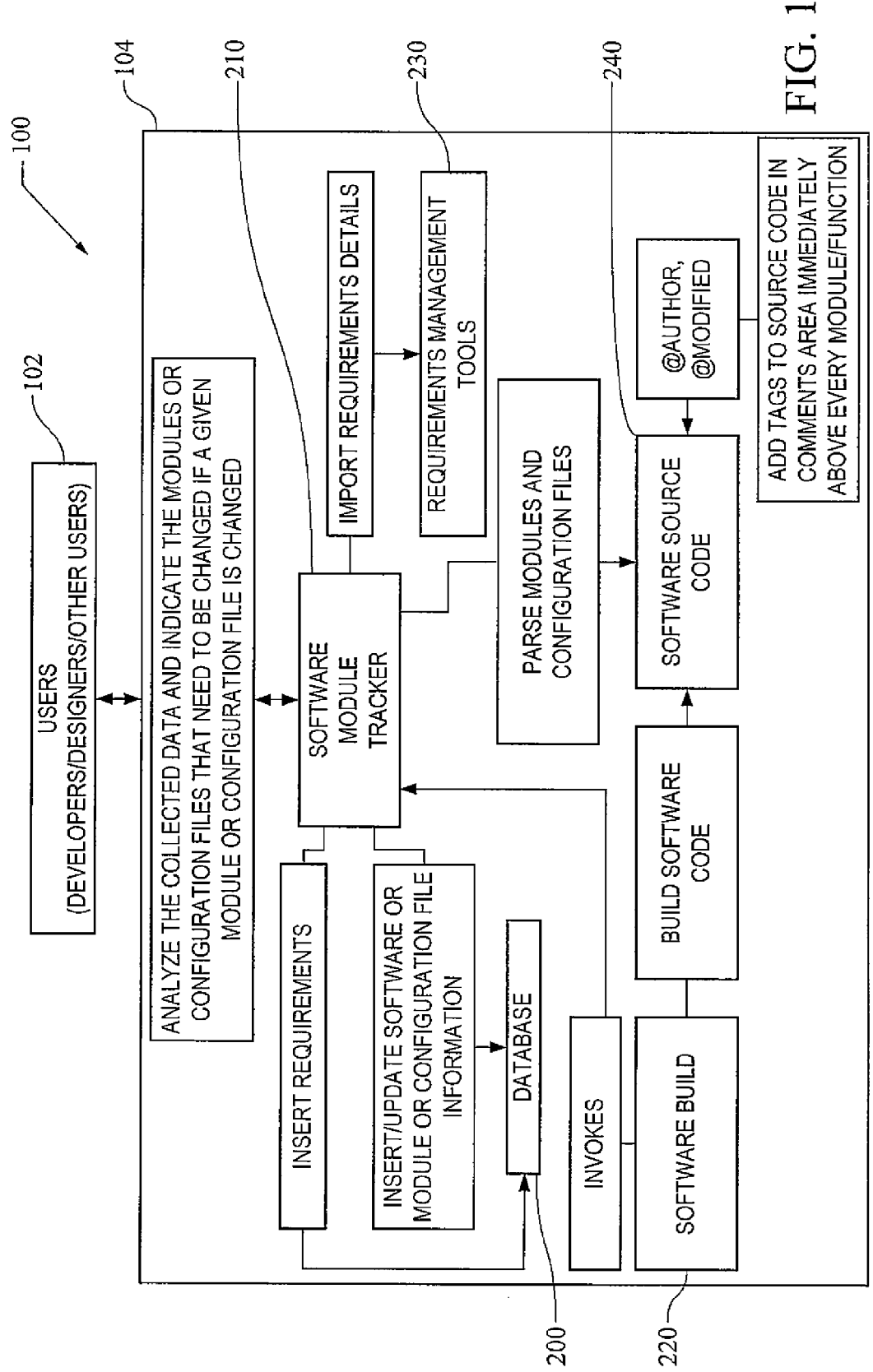
FIG. 1 is a diagram of a system of the present invention.

Definitions and Terminology:

The following definitions and terminology are applied as understood by one skilled in the appropriate art.

The singular forms such as "a," "an," and "the" include plural references unless the context clearly indicates otherwise. For example, reference to "a material" includes reference to one or more of such materials, and "an element" includes reference to one or more of such elements.

As used herein, "substantial" and "about", when used in reference to a quantity or amount of a material, characteristic, parameter, and the like, refer to an amount that is sufficient to provide an effect that the material or characteristic was intended to provide as understood by one skilled in the art. The amount of variation generally depends on the specific implementation. Similarly, "substantially free of" or the like refers to the lack of an identified composition, characteristic, or property. Particularly, assemblies that are identified as being "substantially free of" are either completely absent of the characteristic, or the characteristic is present only in values which are small enough that no meaningful effect on the desired results is generated.

A plurality of items, structural elements, compositional elements, materials, subassemblies, and the like may be presented in a common list or table for convenience. However, these lists or tables should be construed as though each member of the list is individually identified as a separate and unique member. As such, no individual member of such list should be considered a de facto equivalent of any other member of the same list solely based on the presentation in a common group so specifically described.

Concentrations, values, dimensions, amounts, and other quantitative data may be presented herein in a range format. One skilled in the art will understand that such range format is used for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a size range of about 1 dimensional unit to about 100 dimensional units should be interpreted to include not only the explicitly recited limits, but also to include individual sizes such as 2 dimensional units, 3 dimensional units, 10 dimensional units, and the like; and sub-ranges such as 10 dimensional units to 50 dimensional units, 20 dimensional units to 100 dimensional units, and the like.

With reference to the Figures, the preferred embodiments of the present invention will now be described in detail. Generally, the present invention provides an improved system and method for tracking and notifying related software, modules, and configuration files during software development and maintenance.

When a given module or configuration file is updated on a given software (which was originally developed to satisfy a given system requirement), users are notified with a list of all of the related modules, software, and configuration files ((which were originally developed to satisfy a given system requirement) that may need to be changed due to this module or configuration file change. These relationship maintenance and notifications are automatic. The invention may also automatically parse the source code and provide the capability to import data from associated requirements tools.

If a given system requirement is satisfied by multiple number of software which are developed by multiple vendors, the present invention may have the capability to identify all of the related software, configuration files, and modules that were developed for the given system requirement. The present invention may also have the capability to identify and notify the list of related modules, software and configuration files when a given module/software/configuration file is modified. The relationship maintenance and alerts may be automatic. The present invention may have the capability to control via user interface.

When developing computer software programs, a developer or a designer may have to work with a lot of issue such as requirements, deadlines, platform, technologies, etc. As such, the software developers may fail to consider the maintainability of the developed software. The developer that originally developed a given software may no longer be accessible or available to fix any bugs or problems with the software. When another new developer tries to fix bugs or modify a software program developed by others, the new developer may forget or not be aware of linked or related programs or code segments (which were originally developed to satisfy a given system requirement). Many conventional compilers and conventional integrated development environments (IDEs) provide the capability to see the linkage only through the code segment (only when a given module is referenced by other modules in the software). However, conventional compilers and conventional IDEs may fail to identify functional or requirement links with other code blocks or other software. The failure can grow exponentially when software is developed by multiple vendors, especially if a given requirement is implemented using multiple software and is developed using different languages. Analysis of such relationships and coordination can be difficult and may fail when conventional tools and processes are used.

The present invention may provide one or more of the following advantages when compared to conventional tools: (1) If a given system requirement is satisfied by multiple vendors in multiple software, the present invention may have the capability to populate all the related software, modules, and configuration files developed for a given system requirement. This feature may reduce the number of bugs identified during application testing and may improve software maintainability and reliability. (2) The relationship information may be centralized in a database which may allow all the applicable parties to visualize the related modules, software, and configuration files for a given requirement at any given time using any tools which can query relational databases. (3) Automatic alerts may be shown to developers or designers with a list of related software, modules, and configuration files when a given module or configuration file is changed in given software. (4) The requirements details, software details such as software name, vendor, point/person of contact (POC), modules, and configuration file names are automatically extracted from source code files, requirements management tools, etc. (5) The present invention may also include a reporting tool to get a list of all the related modules, configuration files and software for a given system requirement. (6) The present invention may also include both automatic and user interface capability to perform all the intended functions of the invention.

Referring to FIG. 1, a diagram of a system (e.g., apparatus, combination, etc.) 100 of the present invention is shown. The system 100 generally comprises at least one (and generally a plurality of) user(s) sub-systems (e.g., interfaces, terminals with keyboards and/or other control devices, printers and displays, input/output devices, and the like) 102, and a computer implemented hardware/software combination (e.g., processor(s), CPU, arithmetic logic unit, cache, busses, internal and external memory, development system, software build environment, and the like) 104 that is coupled (e.g., connected, interfaced, etc.) to the sub-system 102. The user sub-systems 102 are generally operated by users (e.g., developers, designers, builders, information technology operators, etc.) to design, develop, build, maintain, update, review, modify, etc. operating system, computer software, databases, files, programming, software modules, code including source code, instructions, requirements, I/O, hardware components, etc. that are generally implemented (e.g., executed, performed, run, etc.) via the computer system 104. The conventional hardware and software components and interfaces of the system 100 are implemented as would be understood having skill in the art.

The system 104 comprises a database 200, a software module tracker 210, a software build 220, requirements management tools 230, and software source code 240. As noted above the elements of the computer system 104 (e.g., the database 200, the software module tracker 210, the software build 220, the requirements management tools 230, and the software source code 240) are generally implemented within (e.g., stored, interconnected, interfaced, linked, etc.) a computerized (e.g., processor controlled) environment as a combination of direct hardwire (e.g., cable, fiber optic, and the like), wireless, local and/or external internet/intranet, Web-based interfaces, communications, linkages, software, firmware, and/or hardware for any particular implementation.

An example of a computer system that is typical of hardware implemented in connection with the system 100 may be found, for example, in U.S. Pat. No. 7,890,872, which is incorporated by reference in its entirety on FIG. 1 and in the related description at col. 3, line 60 through col. 5, line 2; and on FIG. 21 and in the related description at col. 14, line 66 through col. 16, line 7.

As discussed below in connection with FIGS. 2 and 3, examples of interfaces, communications, requests, invokes, imports/exports, process steps, method blocks, etc. that may be implemented via the system 100 include but are not limited to display/print/show information to users via the sub-system 102; insert requirements and insert/update software or module or configuration file information between the database 200 and the software module tracker 210; analyze the collected data and indicate the modules or configuration files that need to be changed if a given module or configuration file is changed via the software module tracker 210; invokes between the software module tracker 210 and the software build 220; import requirements details between the software module tracker 210 and the requirements management tools 230; parse modules and configuration files between the software module tracker 210 and the software source code 240; builds software code between the software build 220 and the software source code 240; and add tags (e.g., @author and @modified) to source code in comments area immediately above every module/function) in connection with the software source code 240.

Referring again to FIG. 1, the system 100 comprises: (a) the database 200; (b) the software module tracker (i.e., software requirement relationship tracker (SRRT)) tool 210 comprises four components: (1) Requirements Importer (RI); (2) Software Parser (SP); Database Updater (DU); and Relationship Processor (RP); (c) developer added @author and @modified tags in the source code near the comments area for every module and configuration file. The @modified tag may have the date modified in mm/dd/yyyy or other appropriate format. If more dates are added, each may be followed by a comma, e.g., 01/01/2010, 01/02/2010, etc. The @author tag will generally have the email id of the author, e.g., aa@aa.com; and (d) modification of build or script to invoke the SRRT tool 210.

The system 100 generally includes programming (software) that is stored in memory (e.g., within the environment 104) and included in or coupled to the software tracker module (SRRT tool) 210, and the programming is generally implements via processor operation, a method to analyze collected data, and indicate the modules or configuration files that need to be changed if a given module or configuration file is changed.

Referring to FIG. 2, a diagram illustrating the relational database 200 that may be implemented in connection with (e.g., stored within) the system 100 of FIG. 1 is shown: The database 200 comprises five tables: Requirements Details (RD); Software Details (SD); Module Details (MD); Configuration Details (CD); and Relationship Traceability (RT). Columns in the database 200 and the respective table, in parentheses, may include ReqId (RD and RT); SoftId (SD); ModId (MD and RT); ConfigId (CD and RT); TraceId (RT); ReqName (RD); SoftName (SD); ModName (MD); ConfigName (CD); Author (SD, MD, and CD); vendorName (SD);

POC (SD); Status (SD, MD, CD, and RT); Timestamp (RD, SD, MD, CD, and RT); ConfigType (CD); and Comments (CD and RT).

A more detailed description of the method of the present invention is provided below in connection with FIG. 3. Referring to FIGS. 1 and 2, a high level description of the method of the present invention includes the following steps.

(a) User (e.g., Developer) adds @author and @modified tags.

(b) The SRRT tool 210 may be developed in C++, JAVA programming language, or any appropriate programming language.

(c) User modifies the software build tool or script to invoke the SRRT tool 210. This is generally done in every software build 220 that is developed by every developer (i.e., all vendors that are involved in the software development for a given system requirement). The developer inputs two parameters when invoking the SRRT tool 210. The first one is for "build". The build values can be entered automatically or manually. The second parameter is for "requirements". The requirements values can be "manual" or "the location of the requirements management tool".

(d) When a software build is performed, the SRRT tool 210 is automatically invoked.

(e) The Requirements Importer ("RI") component of the SRRT tool 210 checks the "build" and the "requirements" parameters. If the build parameter is set to "manual", a screen asking the builder to choose the requirements management tools 230 is presented (e.g.; via the user interface 102). If the "build" value is set to "automatic", and if the "requirements parameter value is set to "manual, a screen asking the builder to choose requirements management tools 230 is presented.

If the build is automatic and the requirements parameter is set to "manual", the user is required to be present near the build tool to answer questions. When the build is set to "automatic", the requirements tool must exist and be specified as a parameter to import requirements, else user presence is required at the build tool.

(f) When a user or the location is preset in the SRRT invocation for requirements management, the "RI" automatically imports requirements from the specified tool, e.g., from a tool such as 'rational requisite pro', 'DOORS', or any other appropriate tool.

(g) The data collected from the "RI" is transferred to the "DU" which later inserts information into the "RD" table in the relational database 200. Before inserting, the "DU" ensures that the rows do not already exist.

(h) If no requirements management tool 230 is present, the "RI" presents a screen (e.g., via the user interface 102) to allow users the capability to enter requirements details manually.

(i) After the requirements are imported into the database 200, the "SP" component of the SRRT tool 210 parses all of the source code 240 that is indicated in the software build 220.

(j) During the parsing, the "SP" looks for all of the module names inside the source code 240 and looks for the @author and @modified tags. Based on the values, "SP" collects the data. Once all of the modules from the given software are collected, a screen is presented to allow the users to specify the vendor name and the POC for the software. All of the collected data is sent to the "DU" component which later inserts them into the "SD" and the "MD" tables in the relational database 200. Note: the initial inserts process for the first build of the software.

(k) Later, the "SP" scans the source code 240 and collects all of the configuration files used by each module or software and transfers data to the "DU" which later inserts the data into the "CD" table in the relational database 200.

(l) Once all of the information is inserted in the table, "RP" presents a screen to the users with a list of requirements and drop downs for configuration files, module names and software names. The user can associate the modules, configuration files, and the software names to each of the requirements. The relationship information is then stored in the "RT" table of the relational database 200.

(m) During a second or other subsequent build, the same process from a TO1 is performed for any new modules, configuration files, and software. For each module in the software source code 240, the "SP" looks at the @modified tag for the last modified date and compares the last modified date with the "time stamp" column from the "MD" table for a given module name. If the modified date is later than the timestamp, the "SP" flags the timestamp. A similar sub-process is done for configuration files also.

(n) For each of the flagged modules and the configuration file names, the "RP" retrieves the related modules, configuration files and software names from the "RT" tables and presents a screen to the user. The user can look at the related modules, configuration files and software names and decide if any of the related modules, configuration files and software names are to be modified.

(o) If some modules, configurations, or software is deleted from the source code 240, then "SP" indicates "DU" to mark the appropriate rows in all of the related tables as "deleted" in a status column.

(p) "RP" also provides options to allow users the capability to send email notifications to the specified email addresses with the relationship information.

The SRRT tool 210 can also be executed at any time to view details and use as a documentation to identify the relationship among various software and the requirements satisfied by the various software.

The SRRT tool 210 can run in a batch mode, and can query the database "RT" and send alert emails to the configured people to indicate the possible changes needed for the module, and informs which module was modified.

The SRRT tool 210 can provide any developer the capability to develop software, and maintain the software without the need to involve the original developer.

Figure 3A:
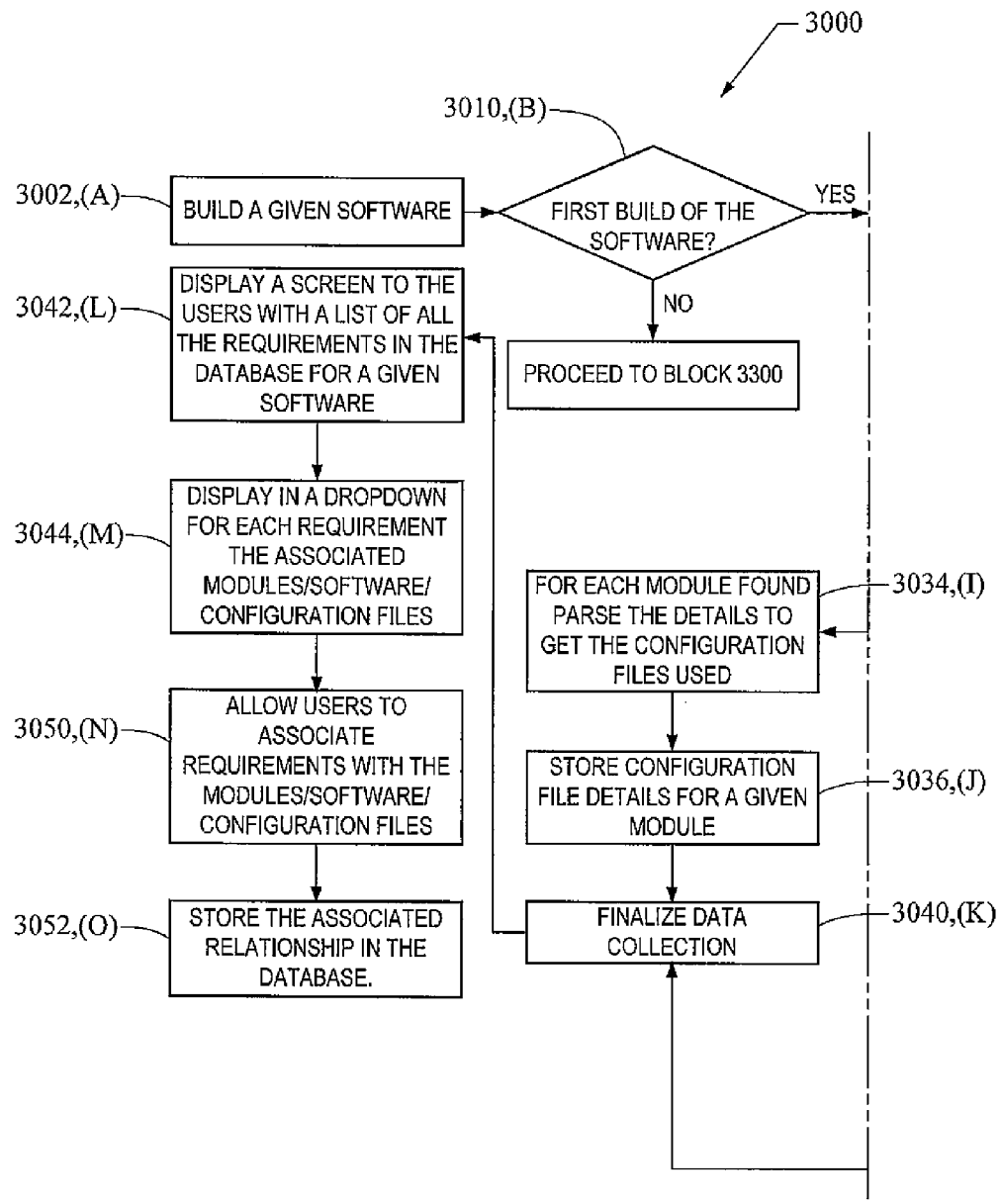
FIG. 3 (shown as interrelated FIGS. 3A, 3B, and 3C) is a flow diagram of a method of the present invention.
Figure 3B:
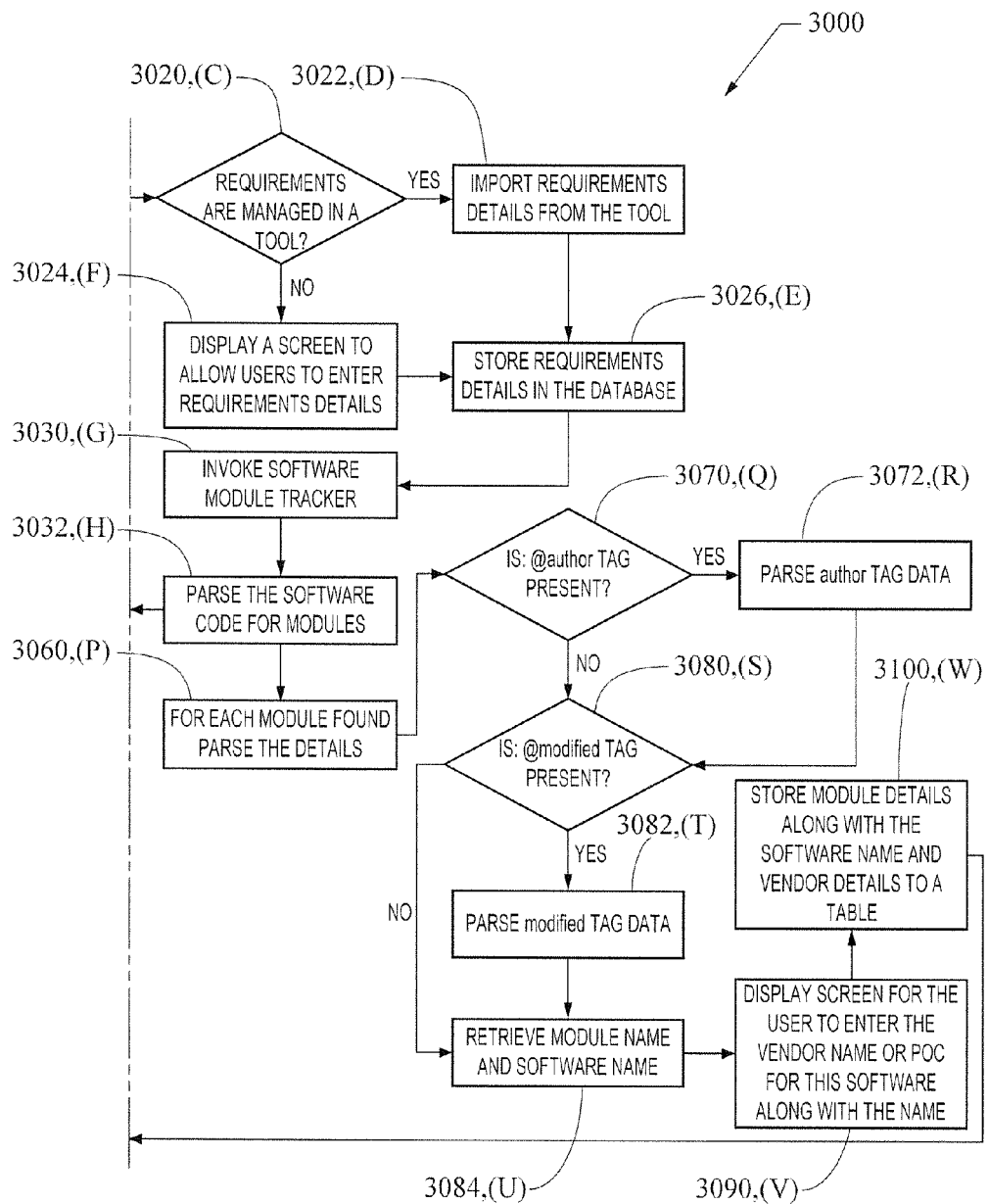
Figure 3C:
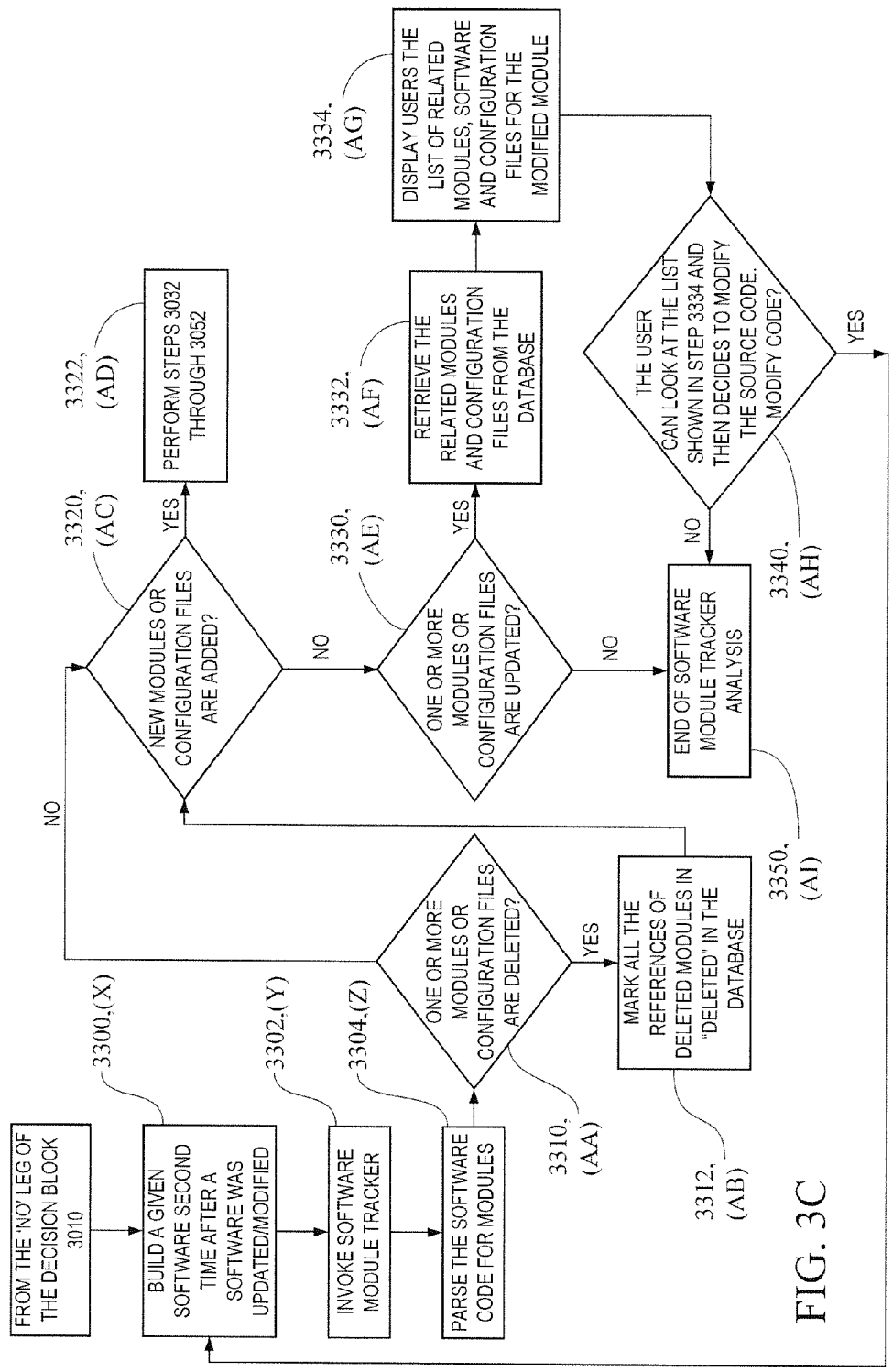

Referring to FIG. 3 (shown as interrelated (linked) FIGS. 3A, 3B, and 3C), a flow diagram of a method 3000 (e.g., process, steps, blocks, etc.) of the present invention is shown. The method 3000 is generally implemented in connection with the system 100. Computer software that implements the method 3000 is generally stored in memory within and/or accessed by and implemented in connection with the computer system 100 (e.g., within the environment 104). The process 3000 generally provides a method for tracking and notifying related software, modules, and configuration files during software development and maintenance.

A build of a given software (i.e., development, modification, update, etc. of software code) is initiated (step or block 3002). The process 3000 generally proceeds to a decision step or block 3010. The process 3000 generally determines whether the build is a first build (the decision step or block 3010). At the decision step or block 3010, when the build that is initiated at the block 3002 is a first build (i.e., the YES leg of the decision block 3010), the method 3000 generally proceeds to a decision step or block 3020.

At the decision block 3020, the process 3000 determines whether requirements are managed in a tool. When requirements are managed in the tool (the YES leg of the decision block 3020), the process 3000 may import details of the requirements from the tool (step or block 3022); and store the requirements details in a database (e.g., the relational database 200) (step or block 3026). When requirements are not managed in the tool (the NO leg of the decision block 3020), the process 3000 may display a screen to allow the users to enter the requirements details (step or block 3024); and store the requirements details in the database (the step or block 3026).

From the step or block 3026, the process 3000 may invoke a software module tracker (step or block 3030); parse the software code for modules (step or block 3032); for each module found, parse details of the module to retrieve the configuration files used for the module (step or block 3034); store configuration file details for the module (step or block 3036); finalize data collection (step or block 3040); display a screen to the user a list of all of the requirements that are in the database for the software (step or block 3042); display in a dropdown for each requirement all of the associated modules, software, and configuration files (step or block 3044); allow (provide for) users to associate requirements with all of the modules, software, and configuration files to establish an associated relationship (step or block 3050); and store the associated relationship in the database (step or block 3052).

Returning to the block 3032, for each module found, parse the details of the module (step or block 3060); and determine whether an @author tag is present (decision step or block 3070). When the @author tag is present (the YES leg of the decision step or block 3070), parse author tag data (step or block 3072); and determine whether an @modified tag is present (decision step or block 3080). Returning to the block 3070, when the @author tag is not present (the NO leg of the decision step or block 3070), proceed to the decision block 3080.

At the decision block 3080, when the @modified tag is present (the YES leg of the decision step or block 3080), the process 3000 may parse the modified tag data (step or block 3082); retrieve the module name and the software name (step or block 3084); display a screen for the user to enter the vendor name or POC for the software along with (in addition to) the name (step or block 3090); store the module details along with the software name and the vendor details (e.g., the vendor name or POC for the software) to a table (e.g., a table in the database 200) (step or block 3100); and proceed to the block 3040.

Returning to the decision block 3080, when the @modified tag is not present (the NO leg of the decision block 3080), the process 3000 may proceed to the block 3084.

Returning to the decision block 3010, when the software build is not the first build (the NO leg of the decision block 3010), the process 3000 may build a given software a second (or subsequent) time after the software was updated or modified (step or block 3300); invoke the software module tracker 210 (step or block 3302); parse the software code for modules (step or block 3304); and determine whether one or more of the modules or the configuration files have been deleted (decision step or block 3310).

When one or more of the modules or the configuration files have been deleted (the YES leg of the decision block 3310), the process 3000 may mark as "deleted" all of the references of the deleted modules in the database 200 (step or block 3312); and determine whether new modules or configuration files added (decision step or block 3320).

Returning to the decision block 3310, when one or more of the modules or the configuration files have not been deleted (the NO leg of the decision block 3310), the process 3000 may proceed to the block 3320.

At the decision block 3320, when new modules or configuration files added (the YES leg of the decision block 3320), the process 3000 may perform the steps 3032 through 3052 (step or block 3322). When new modules or configuration files not added (the NO leg of the decision block 3320), the process 3000 may determine whether one or more modules or configuration files have been updated (decision step or block 3330).

When one or more modules or configuration files have been updated (the YES leg of the decision block 3330), the process 3000 may retrieve related (associated) modules and configuration files from the database 200 (step or block 3332); display to users, a list of the related (associated) modules, software, and configuration files for the modified (updated) module (step or block 3334); and the user can look at the list that is displayed at the step 3334, and decide whether to modify the source code (decision step or block 3340).

When the user decides to modify the source code (the YES leg of the decision block 3340), the process 3000 may return to the block 3300. When the user decides to not modify the source code (the NO leg of the block 3340), the process 3000 may end analysis (i.e., using the software tracker 210 may stop) (step or block 3350).

Returning to the decision step 3330, when one or more modules or configuration files are not updated, the process 3000 may proceed to the block 3350 and end the analysis.

As is apparent then from the above detailed description, the present invention may provide an improved system (e.g., the system 100) and method (e.g., the method 3000) for tracking and notifying related software, modules, and configuration files during software development and maintenance. In particular, the present invention may have the capability to identify all of the related modules, configuration files, and software developed for a given system requirement. The system 100 and the method 3000 may identify all of the related modules, configuration files, and software developed for a given system requirement even if all of the related modules, configuration files, and software developed for a given system requirement are developed by multiple vendors.

Various alterations and modifications will become apparent to those skilled in the art without departing from the scope and spirit of this invention and it is understood this invention is limited only by the following claims.

What is claimed is:

1. A computer implemented system of tracking and notifying a user with regard to associated software, associated modules, and associated configuration files during development and maintenance of a given software, the system comprising:

an interface including display and input/output capability for the user; and a development system having a processor and memory, wherein the development system is coupled to the user interface, the development system comprises:

a database, build programming for the given software, a software module tracker, requirements management tools, and the given software and the associated software include a comments area that includes an @author tag and an @modified tag, wherein the database, the build programming, the requirements management tools, and the given software are coupled to the software module tracker, and the build programming is coupled to the given software and the associated software, wherein the memory includes programming to control the processor to perform a method comprising the steps of:

(A) initiating a build of the given software, wherein the given software includes details of requirements, and the associated software includes an associated software name, and the associated module includes an associated module name;
(B) proceeding to step (X), unless the build is determined to be a first build;
(C) when the build is a first build, determining whether the requirements are managed in the tool;
(D) when the requirements are managed in the tool, importing details of the requirements from the tool;
(E) storing the details of the requirements in a database and proceeding to step (G), and when the requirements are not managed in the tool;
(F) displaying a screen to allow the user to enter the details of the requirements, and proceeding to the step (E);
(G) invoking a software module tracker;
(H) parsing the given software for the associated modules;
(I) for each of associated modules found, parsing to retrieve the associated configuration files used for the associated module;
(J) storing the associated configuration file for the associated module in the database;
(K) finalizing data collection;
(L) displaying to the user a screen of a list of all of the requirements that are in the database for the given software;
(M) displaying in a dropdown to the user for each requirement all of the associated modules, the associated software, and the associated configuration files;
(N) allowing the users to associate the requirements with all of the associated modules, the associated software, and the associated configuration files to establish an associated relationship;
(O) storing the associated relationship in the database;
(P) for each of the associated modules found, parsing the associated module;
(Q) determining whether an @author tag is present, and when the @author tag is present;
(R) parsing author tag data, and also when the @author tag is not present;
(S) determining whether an @modified tag is present, and when the @modified tag is present;
(T) parsing the modified tag data, and also when the @modified tag is not present;
(U) retrieving the associated module name and the associated software name;
(V) displaying a screen for the user to enter a vendor name or a point of contact (POC) for the associated software along with the associated software name;
(W) storing the details of the associated module along with the associated software name, the vendor name or the POC to a table in the database, and proceeding again to the step (K);
(X) when the given software build is not the first build, building the given software a second or subsequent time after the given software was updated or modified;
(Y) invoking the software module tracker;
(Z) parsing the given software to determine the associated modules;
(AA) determining whether one or more of the associated modules or the associated configuration files have been deleted;
(AB) (i) when one or more of the associated modules or the associated configuration files have been deleted, marking as "deleted" all references to the deleted associated modules in the database, and (ii) when one or more of the associated modules or the associated configuration files are not deleted, leaving the associated modules or the associated configuration files unmarked with regard to deletion;
(AC) determining whether new modules or new configuration files added;
(AD) when the new modules or the new configuration files added, performing the steps (H) through (O);
(AE) when the new modules or the new configuration files not added, determine whether one or more of the associated modules or the associated configuration files are updated;
(AF) when one or more of the associated modules or the associated configuration files are updated, retrieving the associated modules and the associated configuration files from the database;
(AG) displaying to the user on a screen on an interface, a list of the associated modules, the associated software, and the associated configuration files for the updated associated module;
(AH) the user looking at the list that is displayed at the step (AG), and deciding whether to modify the given software, and when the user decides to modify the given software, returning to the step (X); and
(AI) repeating the method from step (A), unless the user does not modify the given software, or when one or more of the associated modules or the associated configuration files are not updated.

2. The system of claim 1 wherein, the software module tracker is operated as a documentation tool to identify relationships among the associated software and the requirements satisfied by the associated software.

3. The system of claim 1 wherein, the software module tracker is operated by the user at any time to view the relationships among the associated software and the requirements satisfied by the associated software.

4. The system of claim 3 wherein, the software module tracker is operated in a batch mode.

5. The system of claim 4 wherein, the software module tracker further queries the database and sends alert emails to the POC to indicate possible changes needed for the associated module.

6. The system of claim 1 wherein, the software module tracker provides the user capability to develop the given software, and maintain the given software without involvement of an original developer.

7. The system of claim 1 wherein, the software module tracker informs the user which of the associated modules was modified.

8. The system of claim 1 wherein, the database is a relational database.

9. The system of claim 1 wherein, the software module tracker is programmed in C++.

10. The system of claim 1 wherein, the software module tracker is programmed in JAVA programming language.

11. A computer system implemented method of tracking and notifying a user with regard to associated software, associated modules, and associated configuration files during development and maintenance of a given software, the method comprising the steps of:

(A) initiating a build of the given software, wherein the given software includes details of requirements, and the associated software includes an associated software name, and the associated module includes an associated module name;

(B) proceeding to step (X), unless the build is determined to be a first build;

(C) when the build is a first build, determining whether the requirements are managed in a tool;

(D) when the requirements are managed in the tool, importing details of the requirements from the tool;

(E) storing the details of the requirements in a database and proceeding to step (G), and when the requirements are not managed in the tool;

(F) displaying a screen to allow the user to enter the details of the requirements, and proceeding to the step (E);

(G) invoking a software module tracker;

(H) parsing the given software for the associated modules;

(I) for each of associated modules found, parsing to retrieve the associated configuration files used for the associated module;

(J) storing the associated configuration file for the associated module in the database;

(K) finalizing data collection;

(L) displaying to the user a screen of a list of all of the requirements that are in the database for the given software;

(M) displaying in a dropdown to the user for each requirement all of the associated modules, the associated software, and the associated configuration files;

(N) allowing the users to associate the requirements with all of the associated modules, the associated software, and the associated configuration files to establish an associated relationship;

(O) storing the associated relationship in the database;

(P) for each of the associated modules found, parsing the associated module;

(Q) determining whether an @author tag is present, and when the @author tag is present;

(R) parsing author tag data, and also when the @author tag is not present;

(S) determining whether an @modified tag is present, and when the @modified tag is present;

(T) parsing the modified tag data, and also when the @modified tag is not present;

(U) retrieving the associated module name and the associated software name;

(V) displaying a screen for the user to enter a vendor name or a point of contact (POC) for the associated software along with the associated software name;

(W) storing the details of the associated module along with the associated software name, the vendor name or the POC to a table in the database, and proceeding again to the step (K);

(X) when the given software build is not the first build, building the given software a second or subsequent time after the given software was updated or modified;

(Y) invoking the software module tracker;

(Z) parsing the given software to determine the associated modules;

(AA) determining whether one or more of the associated modules or the associated configuration files have been deleted;

(AB) (i) when one or more of the associated modules or the associated configuration files have been deleted, marking as "deleted" all references to the deleted associated modules in the database, and (ii) when one or more of the associated modules or the associated configuration files are not deleted, leaving the associated modules or the associated configuration files unmarked with regard to deletion;

(AC) determining whether new modules or new configuration files added;

(AD) when the new modules or the new configuration files added, performing the steps (H) through (O);

(AE) when the new modules or the new configuration files not added, determine whether one or more of the associated modules or the associated configuration files are updated;

(AF) when one or more of the associated modules or the associated configuration files are updated, retrieving the associated modules and the associated configuration files from the database;

(AG) displaying to the user on a screen on an interface, a list of the associated modules, the associated software, and the associated configuration files for the updated associated module;

(AH) the user looking at the list that is displayed at the step (AG), and deciding whether to modify the given software, and when the user decides to modify the given software, returning to the step (X); and (AI) repeating the method from step (A), unless the user does not modify the given software, or when one or more of the associated modules or the associated configuration files are not updated.

12. The method of claim 11 wherein, the software module tracker is operated as a documentation tool to identify relationships among the associated software and the requirements satisfied by the associated software.

13. The method of claim 12 wherein, the software module tracker is operated by the user at any time to view the relationships among the associated software and the requirements satisfied by the associated software.

14. The method of claim 13 wherein, the software module tracker is operated in a batch mode.

15. The method of claim 14 wherein, the software module tracker further queries the database and sends alert emails to the POC to indicate possible changes needed for the associated module.

16. The method of claim 11 wherein, the software module tracker provides the user capability to develop the given software, and maintain the given software without involvement of an original developer.

17. The method of claim 11 wherein, the software module tracker informs the user which of the associated modules was modified.

18. The method of claim 11 wherein, the database is a relational database.

19. The method of claim 11 wherein, the software module tracker is programmed in C++.

20. The method of claim 11 wherein, the software module tracker is programmed in JAVA programming language.

* * * * *